(12) United States Patent
Kemperle et al.

(10) Patent No.: US 10,994,462 B2
(45) Date of Patent: *May 4, 2021

(54) PLANARIZING BUILD SURFACES IN THREE-DIMENSIONAL PRINTING

(71) Applicant: MakerBot Industries, LLC, Brooklyn, NY (US)

(72) Inventors: Aljosa Kemperle, Brooklyn, NY (US); Filipp Gelman, Staten Island, NY (US); Peter Joseph Schmehl, New York, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/784,889

(22) Filed: Feb. 7, 2020

(65) Prior Publication Data

US 2020/0171743 A1    Jun. 4, 2020

Related U.S. Application Data

(63) Continuation of application No. 14/922,267, filed on Oct. 26, 2015, now Pat. No. 10,556,381, which is a
(Continued)

(51) Int. Cl.
*B29C 67/00* (2017.01)
*B29C 48/154* (2019.01)
(Continued)

(52) U.S. Cl.
CPC ............. *B29C 48/154* (2019.02); *B29C 48/92* (2019.02); *B29C 64/106* (2017.08);
(Continued)

(58) Field of Classification Search
CPC .......... B33Y 10/00; B33Y 50/00; B33Y 50/02; B29C 64/00; B29C 64/10; B29C 64/386; B29C 64/393
See application file for complete search history.

(56) References Cited

U.S. PATENT DOCUMENTS 5,303,141 A    4/1994   Batchelder et al.
6,129,872 A    10/2000  Jang
(Continued)

OTHER PUBLICATIONS

"Touch Sensor and Automated Calibration", by Assargado—http://forums.reprap.org/read.php?1,8028 Jan. 4, 2008 , 14 pages.
(Continued)

*Primary Examiner* — Thu Khanh T Nguyen
(74) *Attorney, Agent, or Firm* — Strategic Patents, P.C.

(57) ABSTRACT

A technique for planarizing build surfaces in three-dimensional printing includes the use of a three-dimensional printer having an extruder with a sensor mechanically coupled thereto, where the sensor is operable to sense a contact force between the extruder and a separate structure. In particular, the sensor may be used to measure the contact force at a plurality of locations across a build surface of the separate structure, so that a difference between the measured contact force at two or more locations can be identified. In response to the difference between the measured contact force at these locations, a control signal may be created to reduce the difference for planarizing the build surface, e.g., by fabricating a layer on the build surface that mitigates irregularities therein, by gap filling on the build surface, or by adjusting a parameter of the three-dimensional printer.

20 Claims, 5 Drawing Sheets

Related U.S. Application Data continuation of application No. 14/065,516, filed on Oct. 29, 2013, now Pat. No. 9,168,689.

(60) Provisional application No. 61/719,874, filed on Oct. 29, 2012.

(51) Int. Cl.

| | | |
|---|---|---|
| *B29C 64/209* | (2017.01) | |
| *B29C 64/205* | (2017.01) | |
| *B29C 48/92* | (2019.01) | |
| *B29C 64/40* | (2017.01) | |
| *B29C 64/118* | (2017.01) | |
| *B29C 64/386* | (2017.01) | |
| *B29C 64/106* | (2017.01) | |
| *B33Y 30/00* | (2015.01) | |
| *B33Y 50/02* | (2015.01) | |
| *B33Y 80/00* | (2015.01) | |
| *B29C 48/02* | (2019.01) | |
| *B29C 48/265* | (2019.01) | |
| *B29C 48/25* | (2019.01) | |
| *B33Y 50/00* | (2015.01) | |
| *B33Y 10/00* | (2015.01) | |
| *B33Y 40/00* | (2020.01) | |
| *B33Y 70/00* | (2020.01) | |
| *B29K 101/12* | (2006.01) | |
| *B29K 105/00* | (2006.01) | |

(52) U.S. Cl.
CPC .......... *B29C 64/118* (2017.08); *B29C 64/205* (2017.08); *B29C 64/209* (2017.08); *B29C 64/386* (2017.08); *B29C 64/40* (2017.08); *B33Y 30/00* (2014.12); *B33Y 50/02* (2014.12); *B29C 48/02* (2019.02); *B29C 48/265* (2019.02); *B29C 48/266* (2019.02); *B29C 2948/9258* (2019.02); *B29C 2948/92704* (2019.02); *B29K 2101/12* (2013.01); *B29K 2105/0067* (2013.01); *B33Y 10/00* (2014.12); *B33Y 40/00* (2014.12); *B33Y 50/00* (2014.12); *B33Y 70/00* (2014.12); *B33Y 80/00* (2014.12)

(56) References Cited

U.S. PATENT DOCUMENTS

| | | |
|---|---|---|
| 6,629,011 B1 | 9/2003 | Calderon et al. |
| 7,625,198 B2 | 12/2009 | Lipson et al. |
| 7,939,003 B2 | 5/2011 | Bonassar et al. |
| 2014/0117575 A1 | 5/2014 | Kemperle et al. |
| 2016/0039150 A1 | 2/2016 | Kemperle et al. |

OTHER PUBLICATIONS

"HydraRaptor", http://hydraraptor.blogspot.com/2011/04/auto-z-probe.html Apr. 4, 2011, 12 pages.

"Automated Bed Leveling With Our 3D Printer", by Brian Benchoff—http://hackaday.com/2012/04/23/automated-bed-teveling-with-our-3d-printer/ Apr. 23, 2012, 5 pages.

"U.S. Appl. No. 14/922,267 Final Office Action dated Apr. 5, 2019", 8 pages.

"U.S. Appl. No. 14/922,267 Non-Final Office Action dated Sep. 13, 2018", 11 pages.

"U.S. Appl. No. 14/922,267 Notice of Allowance dated Oct. 9, 2019", 7 pages.

"U.S. Appl. No. 14/065,516, Non Final Office Action dated Apr. 9, 2015", 12 pages.

"U.S. Appl. No. 14/065,516, Notice of Allowance dated Jul. 22, 2015", 7 pages.

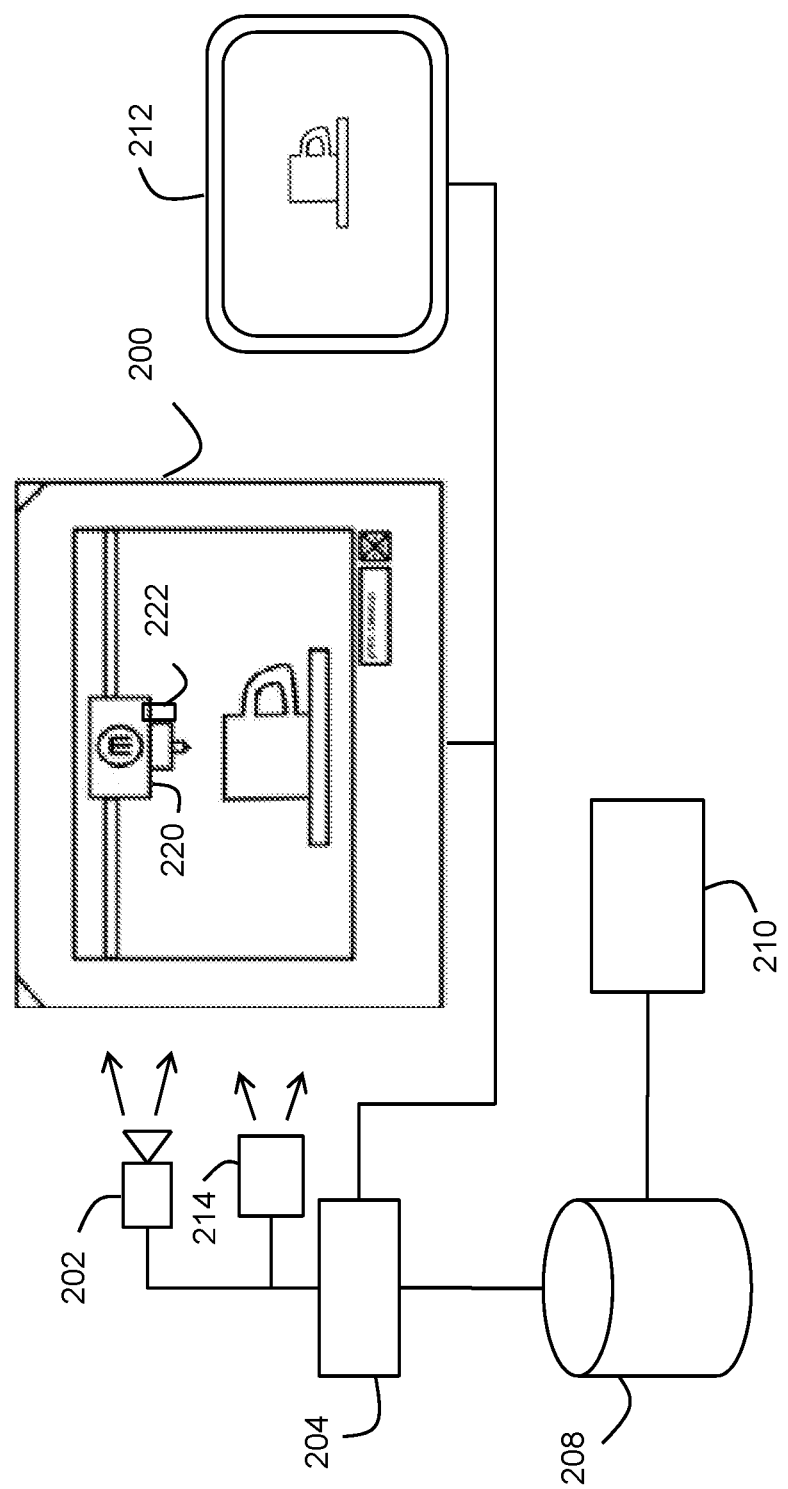

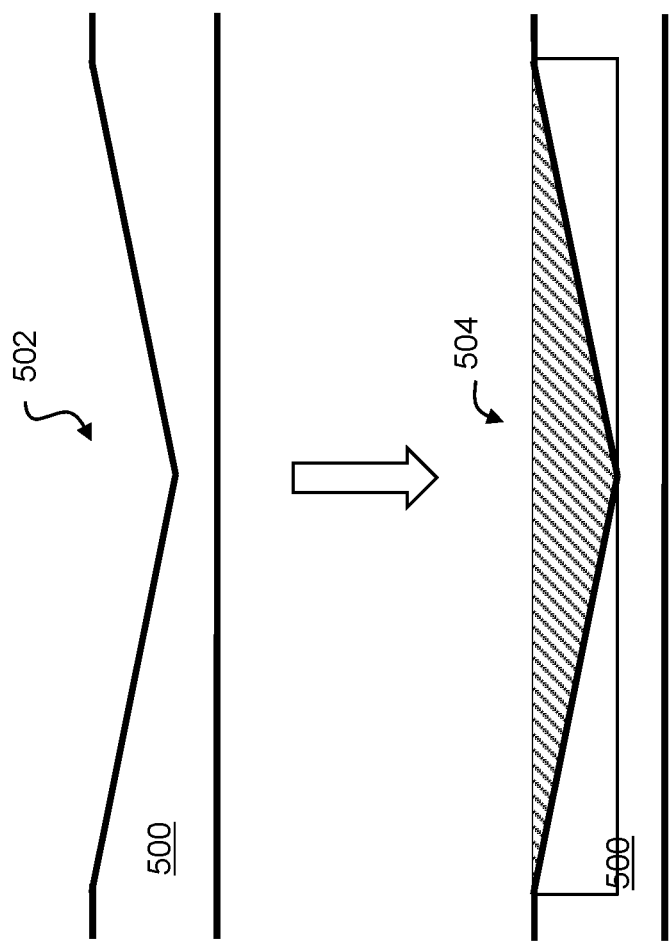

PLANARIZING BUILD SURFACES IN THREE-DIMENSIONAL PRINTING

RELATED APPLICATIONS

This application is a continuation of U.S. patent application Ser. No. 14/922,267 filed Oct. 26, 2015, which is a continuation of U.S. patent application Ser. No. 14/065,516 filed Oct. 29, 2013 (now U.S. Pat. No. 9,168,698), which claims the benefit of U.S. Pat. App. 61/719,874 filed Oct. 29, 2012, where the entirety of each of the foregoing is hereby incorporated by reference herein.

BACKGROUND

Three-dimensional printers can be used to fabricate various desired objects based on computer models of those objects. However, components of the three-dimensional printer may degrade with time—i.e., become dented, warped, misaligned, etc. These errors may disadvantageously affect the ability of the three-dimensional printer to accurately fabricate objects. There remains a need for pressure-sensing extruders and methods for using same.

SUMMARY

An extruder or other tool head of a three-dimensional printer is instrumented to detect contact force against the extruder, such as by a build platform or an object being fabricated. The tool head may also be instrumented to detect deflection forces and the like acting on the tool that might indicate an operating error. The resulting feedback data can be used in a variety of ways to control operation of the three-dimensional printer during fabrication or diagnostics.

BRIEF DESCRIPTION OF THE FIGURES

The invention and the following detailed description of certain embodiments thereof may be understood by reference to the following figures:

FIG. 2 shows a three-dimensional printer.
FIG. 5 shows a cross section of a leveling operation.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a layered series of two dimensional patterns as "roads," "paths" or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Figure 1:
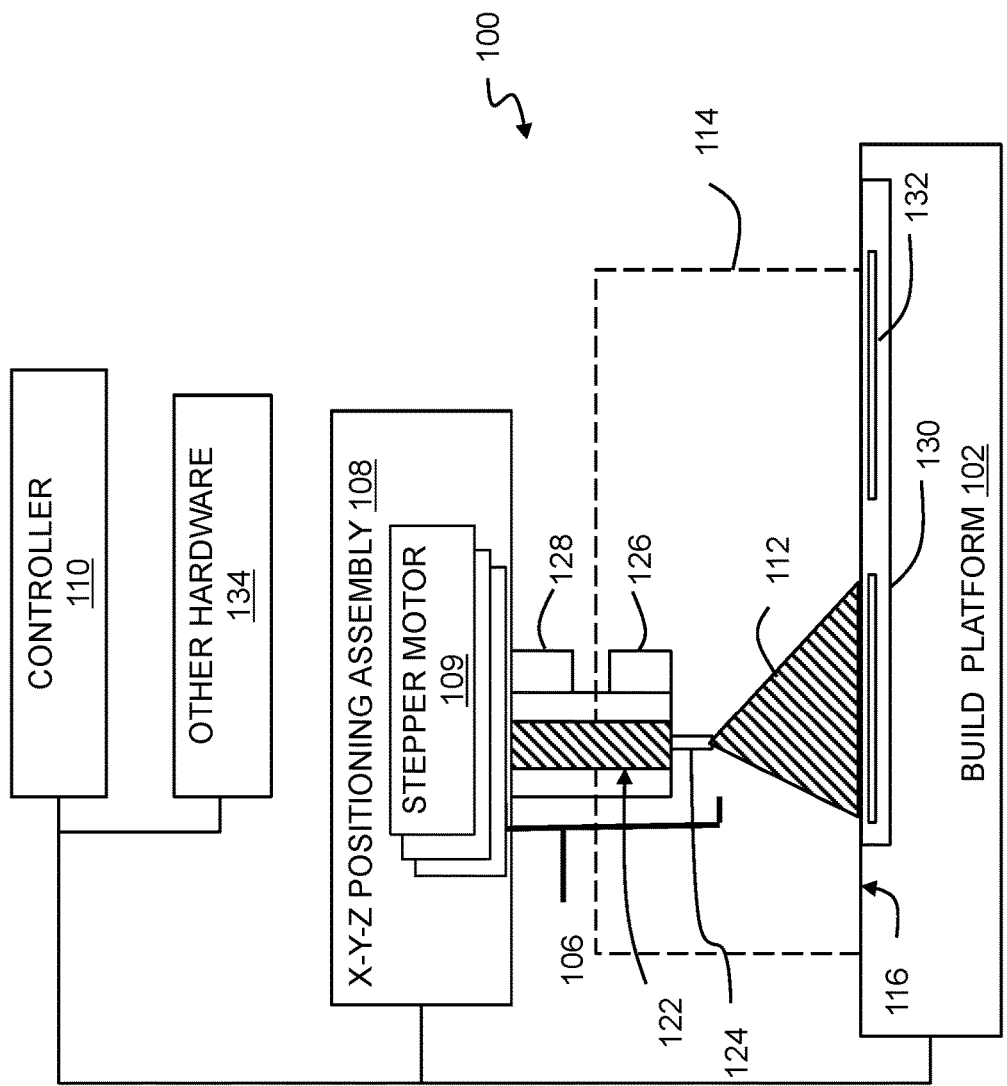
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling affect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 (also referred to as a heating element) to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by a threaded nut so that the threaded rods can be rotated to provide z-axis positioning of the build platform 102 relative to the extruder 124. This arrangement may advantageously simplify design and improve accuracy by permitting an x-y positioning mechanism for the extruder 124 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

FIG. 2 shows a three-dimensional printer. The printer 200 may include a camera 202 and a processor 204. The printer 200 may be configured for augmented operation using two-dimensional data acquired from the camera 202.

The printer 200 may, for example, be any of the three-dimensional printers described above.

The camera 202 may be any digital still camera, video camera, or other image sensor(s) positioned to capture images of the printer 200, or the working volume of the printer 200.

The processor 204, which may be an internal processor of the printer 200, an additional processor provided for augmented operation as contemplated herein, a processor of a desktop computer or the like locally coupled to the printer 200, a server or other processor coupled to the printer 200 through a data network, or any other processor or processing circuitry. In general, the processor 204 may be configured to control operation of the printer 200 to fabricate an object from a build material. The processor 204 may be further configured to adjust a parameter of the printer 200 based upon an analysis of the object in the image. It should be appreciated that the processor 204 may include a number of different processors cooperating to perform the steps described herein, such as where an internal processor of the printer 200 controls operation of the printer 200 while a connected processor of a desktop computer performs image processing used to control print parameters.

A variety of parameters may be usefully adjusted during a fabrication process. For example, the parameter may be a temperature of the working volume. This temperature may be increased or decreased based upon, e.g., an analysis of road dimensions (e.g. height and width of line of deposited build material), or the temperature may be adjusted according to a dimensional stability of a partially fabricated object. Thus, where sagging or other variations from an intended shape are detected, the temperature may be decreased. Similarly, where cooling-induced warping or separation of layers is detected, the temperature may be increased. The working volume temperature may be controlled using a variety of techniques such as with active heating elements and/or use of heated or cooled air circulating through the working volume.

Another parameter that may be usefully controlled according to the camera image is the temperature of a build platform in the working volume. For example, the camera 202 may capture an image of a raft or other base layer for a fabrication, or a first layer of the fabricated object, and may identify defects such as improper spacing between adjacent lines of build material or separation of the initial layer from the build platform. The temperature of the build platform may in such cases be heated in order to alleviate cooling-induced warping of the fabricated object at the object-platform interface.

Another parameter that may be usefully controlled according to an analysis of the camera image is the extrusion temperature of an extruder. By heating or cooling the extruder, the viscosity of a build material may be adjusted in order to achieve a desired material deposition rate and shape, as well as appropriate adhesion to underlying layers of build material. Where roads of material deviate from a predetermined cross-sectional shape, or otherwise contain visible defects, the extrusion temperature of the extruder may be adjusted to compensate for such defects.

Similarly, the parameter may be an extrusion rate of a build material from the extruder. By controlling a drive motor or other hardware that forces build material through the extruder, the volumetric rate of material delivery may be controlled, such as to reduce gaps between adjacent lines of build material, or to reduce bulges due to excess build material.

In another aspect, the parameter may be a viscosity of build material, which may be controlled, e.g., by controlling the extruder temperature or any other controllable element that can transfer heat to and from build material as it passes through the extruder. It will be understood that temperature control is one technique for controlling viscosity, but other techniques are known and may be suitable employed, such as by selectively delivering a solvent or the like into the path of the build material in order to control thermal characteristics of the build material.

Another parameter that may be usefully controlled is a movement speed of the extruder during an extrusion. By changing the rate of travel of the extruder, other properties of the build (e.g., road thickness, spatial rate of material delivery, and so forth) may be controlled in response to images captured by the camera 202 and analyzed by the processor 204.

In another aspect, the parameter may be a layer height. By controlling the z-positioning hardware of the printer 200, the layer height may be dynamically adjusted during a build.

The printer may include a memory 208, such as a local memory or a remote storage device, that stores a log of data for an object being fabricated including without limitation a value or one or more of the parameters described above, or any other data relating to a print. The memory 208 may also or instead store a log of data aggregated from a number of fabrications of a particular object, which may include data from the printer 200 and/or data from a number of other three-dimensional printers.

A second processor 210, such as a processor on a server or other remote processing resource, may be configured to analyze the log of data in the memory 208 to identify a feature of the object that is difficult to print. For example, where a corner, overhang, or the like consistently fails, this may be identified by analysis of the log of data, particularly where such failures can be automatically detected based upon analysis of images from the camera 202. Such failures may be logged in any suitable manner including quantitatively as data characterizing the failure (based upon image analysis), metadata (e.g., percent completion, build parameters, and so forth) and/or a simple failure flag, which may be accompanied by an image of the failed build. In this manner, the second processor 210 can identify features that should be avoided in printable models, and/or objects that are generally difficult or impossible to print. The second processor 210 may also or instead be configured to analyze the results of variations in one or more of the parameters described above. It will be understood that, while the second processor 210 may be usefully located on a remote processing resource such as a server, the second processor 210 may also be the same as the processor 204, with logging and related analysis performed locally by the printer 200 or a locally coupled computer.

The printer 200 may optionally include a display 212 configured to display a view of the working volume. The display 212, which may obtain images of the working volume from the camera 202 or any other suitable imaging hardware, may be configured, e.g., by the processor 204, to superimpose thermal data onto the view of the working volume. This may, for example, include thermistor data or data from other temperature sensors or similar instrumentation on the printer 200. For example, the printer 200 may include sensors for measuring a temperature of at least one of the extruder, the object, the build material, the working volume, an ambient temperature outside the working volume, and a build platform within the working volume. These and any similar instrumentation may be used to obtain thermal data correlated to specific or general regions within and without the printer 200. Where the camera 202 includes an infrared camera, the thermal data may also or instead include an infrared image, or a thermal image derived from such an infrared image.

The display 212 may serve other useful purposes. For example, the view from the camera 202 may be presented in the display. The processor 204 may be configured to render an image of a three-dimensional model used to fabricate an object from the pose of the camera 202. If the camera 202 is a fixed camera then the pose may be a predetermined pose corresponding to the camera position and orientation. If the camera 202 is a moving camera, the processor 204 may be further programmed to determine a pose of the camera 202 based upon, e.g., fiducials or known, visually identifiable objects within the working volume such as corners of a build platform or a tool head, or to determine the pose using data from sensors coupled to the camera and/or from any actuators used to move the camera. The rendered image of the three-dimensional model rendered from this pose may be superimposed on the view of the working volume within the display 212. In this manner, the printer 200 may provide a preview of an object based upon a digital three-dimensional model, which preview may be rendered within the display 212 for the printer, or a user interface of the display, with the as-fabricated size, orientation, and so forth. In order to enhance the preview, other features such as build material color may also be rendered using texture mapping or the like for the rendered image. This may assist a user in selecting build material, scaling, and so forth for an object that is to be fabricated from a digital model.

In another aspect, the printer 200 may optionally include a sensor 214 for capturing three-dimensional data from the object. A variety of suitable sensors are known in the art, such as a laser sensor, an acoustical range finding sensor, an x-ray sensor, and a millimeter wave radar system, any of which may be adapted alone or in various combinations to capture three-dimensional data. The display 212 may be configured to superimpose such three-dimensional data onto the display of the object within the working volume. In this manner, the processor 204 may detect one or more dimensional inaccuracies in the object, such as by comparison of three-dimensional measurements to a digital model used to fabricate the object. These may be presented as dimensional annotations within the display 212, or as color-coded regions (e.g., yellow for small deviations, red for large deviations, or any other suitable color scheme) superimposed on the display of the object. The processor 206 may be further configured to show summary data in the display 212 concerning any dimensional inaccuracies detected within the object.

The sensor 214 may more generally include one or more spatial sensors configured to capture data from the object placed within the working volume. The second processor 210 (which may be the processor 204) may convert this data into a digital model of the object, and the processor 204 may be configured to operate the printer 200 to fabricate a geometrically related object within the working volume based upon the digital model. In this manner, the printer 200 may be used for direct replication of objects simply by placing an object into the working volume, performing a scan to obtain the digital model, removing the object from the working volume, and then fabricating a replica of the object based upon the digital model. More generally, any geometrically related shape may be usefully fabricated using similar techniques.

For example, the geometrically related object may be a three-dimensional copy of the object, which may be a scaled copy, and/or which may be repeated as many times as desired in a single build subject to spatial limitations of the working volume and printer 200. In another aspect, the geometrically related object may include material to enclose a portion of the object. In this manner, a container or other enclosure for the object may be fabricated. In another aspect, the geometrically related object may include a mating surface to the object, e.g., so that the fabricated object can be coupled to the original source object. This may be particularly useful for fabrication of snap on parts such as aesthetic or functional accessories, or any other objects that might be usefully physically mated to other objects. Similarly, a repair piece for a broken object may be fabricated with a surface matched to an exposed surface of the broken object, which surface may be glued or otherwise affixed to the broken object to affect a repair.

The processor 204 may obtain the digital model using, e.g., shape from motion or any other processing technique based upon a sequence of two-dimensional images of an object. The multiple images may be obtained, for example, from a plurality of cameras positioned to provide coverage of different surfaces of the object within the working volume. In another aspect, the one or more spatial sensors may include a single camera configured to navigate around the working volume, e.g., on a track or with an articulating arm. Navigating around the working volume may more generally include circumnavigating the working volume, moving around and/or within the working volume, and/or changing direction to achieve various poses from a single position. The one or more spatial sensors may also or instead include articulating mirrors that can be controlled to obtain multiple views of an object from a single camera.

In another aspect, the one or more spatial sensors 214 may include controllable lighting that can be used, e.g., to obtain different shadowed views of an object that can be interpreted to obtain three-dimensional surface data. The processor 204 (or the second processor 210) may also provide a computer automated design environment to view and/or modify the digital model so that changes, adjustments, additions, and so forth may be made prior to fabrication.

In another aspect, a tool head 220 of the printer may be usefully supplemented with a camera 222. The tool head 220 may include any tool, such as an extruder or the like, to fabricate an object in the working volume of the printer. In general, the tool head 220 may be spatially controlled by an x-y-z positioning assembly of the printer, and the camera 222 may be affixed to and moving with the tool head 220. The camera 222 may be directed toward the working volume, such as downward toward a build platform, and may provide a useful bird's eye view of an object on the build platform. The processor 204 may be configured to receive an image from the camera and to provide diagnostic information for operation of the three-dimensional printer based upon an analysis of the image.

For example, the diagnostic information may include a determination of a position of the tool head within the working volume. The diagnostic information may also or instead include a determination of whether the three-dimensional printer has effected a color change in build material. The diagnostic information may also or instead include a determination of whether the three-dimensional printer has effected a change from a first build material to a second build material. The diagnostic information may also or instead include an evaluation of whether a build material is extruding correctly from the tool head. The diagnostic information may also or instead include an evaluation of whether an infill for the object is being fabricated correctly. In one aspect, the diagnostic information may include the image from the camera, which may be independently useful as a diagnostic tool.

Where the processor 204 is capable of dynamically modifying tool instructions, the processor 204 may be configured to dynamically generate a pattern to infill the object based, for example, on an outline image of the object or previous infilling patterns identified in the image from the camera.

Figure 3:
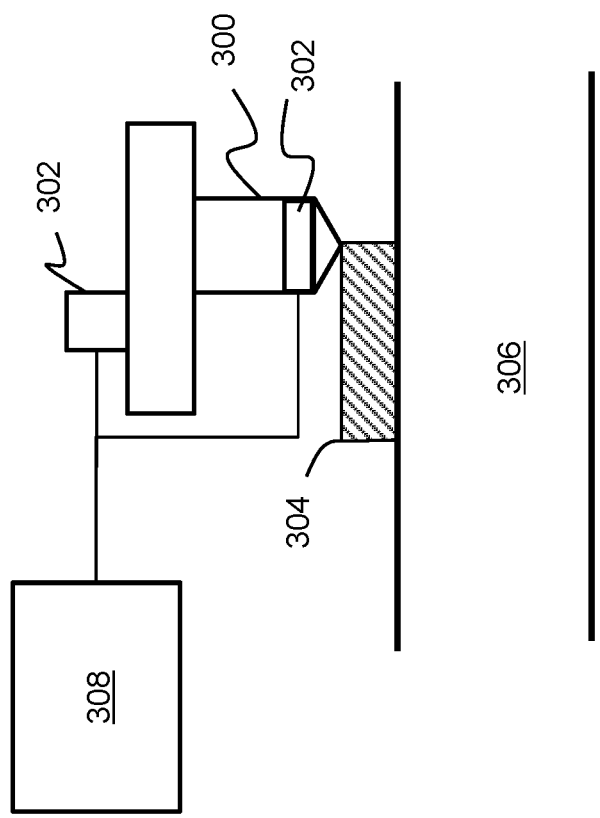
FIG. 3 is a block diagram of a fabrication tool for use in a three-dimensional printer.

FIG. 3 is a block diagram of a fabrication tool for use in a three-dimensional printer. The tool 300 may include, for example, an extruder or other tool operable to add build material to an object 304 during a build process as generally described above. One or more sensors 302 may be mechanically coupled or otherwise included in the fabrication tool 300. Each sensor 302 may be operable to sense a contact force between the fabrication tool 300 and a separate structure, such as the object 304, the build platform 306, or some other structure.

The sensors 302 may collectively or individually sense the contact force along one, two, three, or more pairwise non-parallel axes. For example, a normal force (e.g., instantaneous contact force) between the fabrication tool 300 and the build platform 306 may be sensed; a direction and magnitude of deflection of the tip of the fabrication tool (including displacement and/or force) may be sensed in any positions or directions, etc. More generally, sensors that are collectively operable to sense any force or displacement of the fabrication tool and separate structure, or any related properties such as compression or strain, may be used as sensors 302, so long as the contact force(s) described above may be calculated from the sensed physical characteristics.

In some implementations, sensors 302 may include one or more of capacitive sensors, optical sensors, potentiometric sensors, piezoelectric sensors, or other electromechanical, electromagnetic (e.g., those relying on inductance, the Hall effect, electromagnetic eddy currents, linear variable differential transformers, etc.), acoustical, or other sensors, as well as other sensors or combinations of the foregoing. Strain gauges are one common sensor used for such measurements, and may be suitably adapted for use with the systems and methods disclosed herein, such as by affixing one or more strain gauges to an extruder or other location along a mechanical chain that supports an extruder in an intended position during fabrication. By using a pair of strain gauges, deflection forces may be isolated from normal force.

Each sensor 302 may be in data communication with a controller 308. The data communication may be implemented by any means, including via physical connection (e.g., by wire or fiber optic cable) directly to the controller 308, indirectly through other components, or wirelessly (e.g., via WiFi signal, infrared signal, acoustic signal, etc.). Each sensor 302 may be operable to transmit a signal to the controller, such that the contact force(s) between the fabrication tool and the separate structure may be calculated from the collection of sensor signals 302. As described more fully below, the controller 308 may include circuitry for determining and transmitting, based at least in part on the sensor signals, a control signal to various actuators or other components of the three-dimensional printer to control the three-dimensional printer in a manner responsive to the detected forces.

Figure 4:
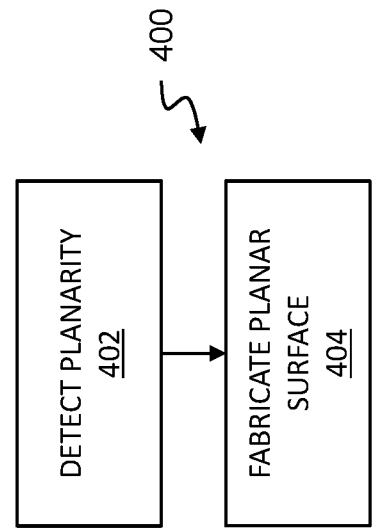
FIG. 4 is a flowchart of a process for using an instrumented fabrication tool.

FIG. 4 is a flowchart for using an instrumented fabrication tool. In particular, FIG. 4 shows a technique for mitigating planar irregularities in a build surface such as a build platform or a top surface of an object being fabricated.

In one aspect, the process 400 may be performed prior to fabricating a desired object so as to planarize as build platform.

As shown in step 402, the process 400 may begin by detecting the planarity of a surface (e.g., the build platform of a three-dimensional printer). This evaluation may be based upon a number of contact force measurements across the surface. It may be expected that for ideal (e.g., perfectly planar) surfaces and a similarly ideal x-y carriage for positioning a tool, a number of contact force measurements at different locations on the surface should be equal. However, it may occur that some of these contact force measurements are different from others.

The differences amongst the measured contact forces may be attributed to warping of the surface, physical damage to the surface, (e.g., dents, scratches, etc.), the surface having become skewed or misaligned with respect to its intended mounting position in the three-dimensional printer, or other causes. It will be understood that positional measurements may also or instead be suitably employed to planarize a surface as contemplated herein. In some implementations, the surface contact forces may be stored along with corresponding x-y positions on the surface and used later (e.g., during fabrication) to compensate for the measured irregularities, as described more fully below.

Other steps may optionally be performed at this point. For example, where the collection of measurements indicates that the surface is level, but skewed to an x-y plane of a fabrication process, a user alert may be generated notifying the user that the surface (e.g., a build platform) requires leveling. In another aspect, where the collection of measurements indicates gross irregularities that may be difficult to address with added built material, an error message may be created and operation of the three-dimensional printer may be paused or terminated.

As shown in step 404, a layer may be fabricated on the surface that mitigates one or more irregularities in the surface. In some implementations, fabricating the layer may include: (a) identifying the maximum contact force (or displacement) measured across the surface; (b) at locations where the contact force was measured, depositing an amount of build material at those locations on the surface proportional to the deviation of the contact force measured at that location from the maximum contact force; and (c) at locations where the contact force was not measured, deriving an estimated contact force by interpolation, regression, multidimensional curve fitting, or other mathematical model; and (d) depositing an amount of build material at those locations proportional to the deviation of the estimated contact force at that location from the maximum contact force. Equivalently, this process involves filling in gaps in the surface with build material, so that the resultant layer is effectively planar.

This process 400 may be usefully employed prior to initiating a fabrication process in order to ensure a level surface for building. This process 400 may also or instead be used periodically during a fabrication process to ensure that a build remains leveled, or continuously, e.g., by monitoring contact force and controlling flow rate, to maintain a level top surface of an object during fabrication.

FIG. 5 shows a cross section of a leveling operation, such as the leveling process described above. In general, a surface 500 of a build platform (or a top surface of an object being fabricated) may include a dent 502, which is subsequently filled with build material to form the layer 504. Fabrication of additional objects may now be performed on the top surface of the layer, and any errors that may have been introduced by the dent 502 may be mitigated by the layer 504.

Figure 6:
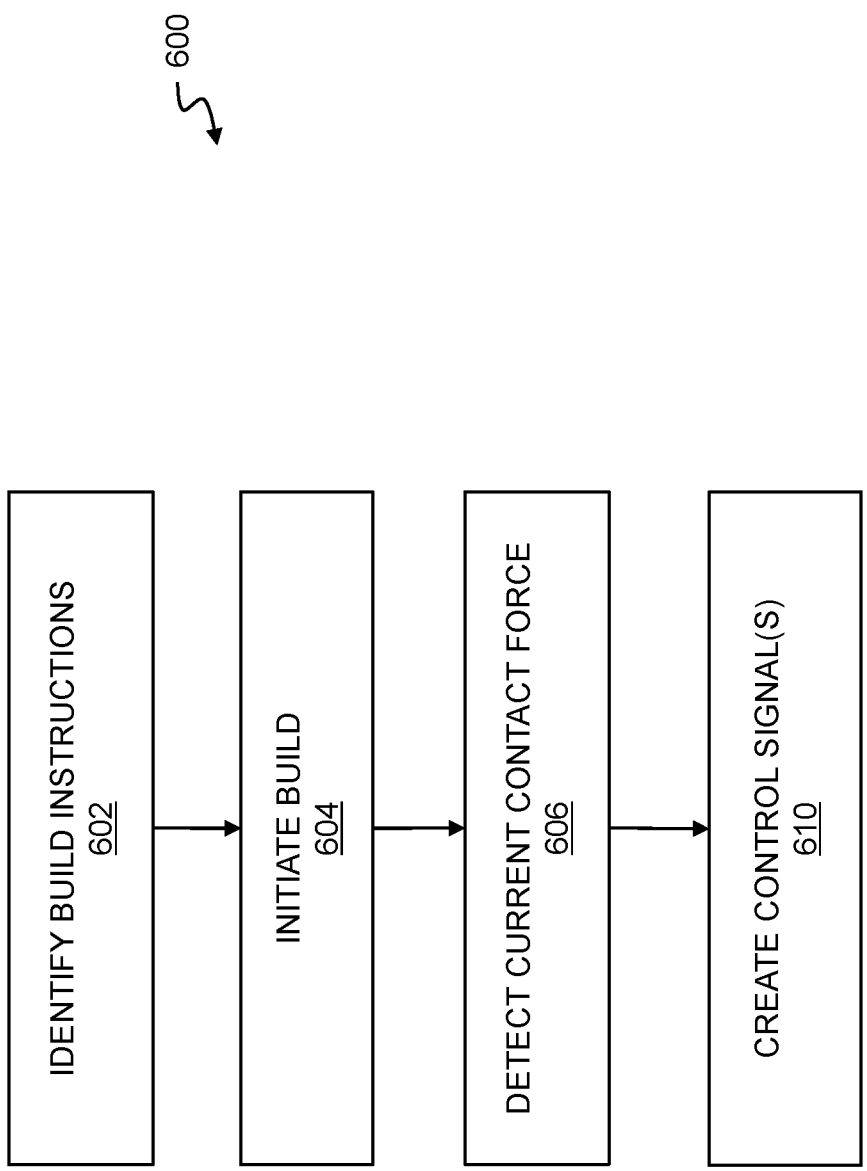
FIG. 6 is a flowchart of a process for fabricating an object.

FIG. 6 is a flowchart of a process for fabricating an object.

As shown in step, 602, the process 600 may begin with identifying build instructions for fabricating an object. It will be understood that in this context, the term "identifying" is intended to be construed broadly, and may include retrieving instructions from storage, generating machine-ready code from a three-dimensional model, or modifying other machine-ready code prior to fabrication. Regardless of how such instructions are identified, a printer may be provided with instructions that can be executed to fabricate an object.

As shown in step 604, the process 600 may include initiating a build using a three-dimensional printer. The three-dimensional printer may include any of the three-dimensional printers described above, and may for example include a fabrication tool such as an extruder and one or more sensors such as strain gauges mechanically coupled to the fabrication tool. The one or more sensors may be configured to detect a current contact force between the fabrication tool and the separate structure, and to provide corresponding data to a controller of the three-dimensional printer for use during fabrication.

As shown in step 606, a current contact force may be detected. The current contact force may be used directly as an input to a control program executing on the controller for the three-dimensional printer, or the current contact force may be compared to other data such as a previous contact force or an expected contact force in order to determine an appropriate response. It will be appreciated that other forces may also be sensed and used in feedback systems as contemplated herein. For example, a deflection force on the fabrication tool may be measured, or a positional deflection or displacement may be measured, in order to determine when adjustments might be made or when a process should be paused or terminated due to an inferred failure.

As shown in step 608, the process 600 may include creating a control signal in response to the current contact force. The control signal may be generated, e.g., by the controller, to control at least one component of the three-dimensional printer during a build. For example, the component may be a drive system for a filament of build material or other hardware that controls a feed rate for build material, and the control signal may change the feed rate of build material extruded by an extruder to increase or decrease the current contact force measured by the sensor(s). In another aspect, the component may be a component that controls a z-axis position of an extruder within a build volume of a three-dimensional printer, e.g., by controlling a distance between the extruder and a build platform (or more generally, between a fabrication tool and a separate structure), and the control signal may vary the distance to adjust to maintain relatively steady material deposition while adjusting to surface irregularities. More generally, the controller may adjust to sensed conditions by adjusting any suitable parameter of the three-dimensional printer to obtain an operational target, such as reducing a difference between the current contact force and an expected contact force or a target contact force.

Where a detected current contact force exceeds some threshold, or deviates from an expected value by a certain relative or absolute amount, other actions may be taken. For example, the process 600 may include terminating a build when a difference between the current contact force and the expected contact force indicates a fabrication error.

In another aspect, control data may be incorporated directly into machine ready code for use during fabrication. For example a build instruction in machine-ready code may directly specify a target for the contact force, e.g., as an explicit instruction to achieve or maintain a specified contact force between the fabrication tool and a separate structure. With such an instruction, a control signal may be generated during fabrication that controls one or more components of a three-dimensional printer (e.g., components that control feed rate, z-axis position, extrusion head speed, temperature) to achieve the specified contact force.

In another aspect, the method may include detecting planarity and responsively making corrections as described above with reference to FIG. 4. This leveling process may be performed prior to or concurrently with a fabrication process for an object.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method of planarizing build surfaces in three-dimensional printing, the method comprising:
   initiating a build using a three-dimensional printer including an extruder and one or more sensors mechanically coupled to the extruder, the one or more sensors operable to sense a contact force between the extruder and a separate structure distinct from the extruder;
   measuring the contact force at a plurality of locations across a build surface of the separate structure using the one or more sensors;

identifying a difference between the measured contact force at two or more locations of the plurality of locations; and creating a control signal to adjust the build in response to the difference between the measured contact force at the two or more locations, the control signal configured to reduce the difference for planarizing the build surface.

2. The method of claim 1, wherein the control signal includes instructions to fabricate a layer on the build surface that mitigates one or more irregularities in the build surface.

3. The method of claim 2, further comprising fabricating the layer using the three-dimensional printer.

4. The method of claim 3, wherein fabricating the layer includes:

identifying a maximum contact force measured across the build surface; and depositing an amount of build material at each of the plurality of locations where the contact force was measured besides a location of the maximum contact force, the amount of build material proportional to a deviation of measured contact force from the maximum contact force.

5. The method of claim 4, further comprising:

deriving an estimated contact force at locations along the build surface where contact force was not measured; and depositing build material at the locations along the build surface where contact force was not measured in an amount that is proportional to a deviation of the estimated contact force from the maximum contact force.

6. The method of claim 1, wherein the control signal includes instructions to fill one or more gaps in the build surface with build material deposited from the extruder.

7. The method of claim 1, further comprising, based on the control signal, pausing or terminating the build when the difference between the measured contact force indicates a fabrication error.

8. The method of claim 1, further comprising storing the measured contact force at the plurality of locations with corresponding positional information regarding the plurality of locations.

9. The method of claim 8, further comprising implementing adjustments to the build using the stored measured contact force.

10. The method of claim 1, further comprising generating a notification for sending to a user of the three-dimensional printer in response to the difference between the measured contact force.

11. The method of claim 10, wherein the notification includes an alert that the build surface is nonplanar.

12. The method of claim 10, wherein the notification includes an error message.

13. The method of claim 1, wherein the separate structure includes an object being fabricated by the three-dimensional printer.

14. The method of claim 1, wherein the separate structure includes a build platform of the three-dimensional printer.

15. The method of claim 1, wherein the contact force is a force normal to the build surface.

16. The method of claim 1, wherein the one or more sensors include at least one of a strain gauge, a piezoelectric sensor, a capacitive sensor, an optical sensor, an electromechanical sensor, an electromagnetic sensor, and an acoustical sensor.

17. The method of claim 1, wherein the difference between the measured contact force indicates one or more of warping of the build surface, physical damage to the build surface, and a misalignment of the build surface.

18. The method of claim 1, wherein the control signal includes one or more of an adjustment to a z-axis position of the extruder, an adjustment to a feed rate of build material extruded by the extruder, and an adjustment to a speed of movement of the extruder.

19. The method of claim 1, wherein adjustments to the build based on the control signal are employed prior to initiating fabrication of an object using the three-dimensional printer.

20. The method of claim 1, wherein adjustments to the build based on the control signal are employed subsequent to initiating fabrication of an object using the three-dimensional printer.

* * * * *